United States Patent [19]

Watson

[11] Patent Number: 4,967,077
[45] Date of Patent: Oct. 30, 1990

[54] MULTIPLE APERTURE ARRAYS FOR OPTICAL AND RADIO FREQUENCY SIGNALS

[75] Inventor: Steven M. Watson, Fairborn, Ohio

[73] Assignee: The United States of America as represented by the Secretary of the Air Force, Washington, D.C.

[21] Appl. No.: 349,012

[22] Filed: May 9, 1989

[51] Int. Cl.⁵ ............................................. N01J 40/14
[52] U.S. Cl. .................................. 250/237 R; 343/770
[58] Field of Search .................... 250/237 R; 343/776, 343/770, 778

[56] References Cited

U.S. PATENT DOCUMENTS

| | | |
|---|---|---|
| 1,860,123 | 5/1932 | Yagi . |
| 2,837,728 | 6/1958 | Schuck .................................... 340/9 |
| 3,495,263 | 2/1970 | Amitay et al. ....................... 343/778 |
| 3,502,387 | 3/1970 | Hadley ................................. 350/55 |
| 3,633,208 | 1/1972 | Ajioka ................................. 343/778 |
| 4,236,161 | 11/1980 | Ohm .................................... 343/781 |
| 4,639,586 | 1/1987 | Fender et al. ....................... 250/201 |
| 4,725,138 | 2/1988 | Wirth et al. ......................... 356/121 |
| 4,797,682 | 1/1989 | Klimczak ............................. 343/770 |

OTHER PUBLICATIONS

Watson, S. M., Mills, J. P., and Rogers, S. K. "Two-Point Resolution Criterion for Multi-Aperture Optical Telescopes," Journal of the Optical Society of American A. vol. 5. Jun. (1988).
Shack, R. V., Ramcourt, J. D., and Morrow H. "Effects of Dilution on a six-Element Synthetic Aperture," Applied Optics 10, 257-259 (1971).
Born, M. and Wolf, E. Principles of Optics. New York: Pergamon Press, 1980.
Toraldo Di Francia, G. "Super-Gain Antennas and Optical Resolving Power." Suppltemento Al vol. XI, Series Del Nuovo Cimento, 426, 1952.
Goodman, Joseph W. Introduction to Fourier Optics. San Francisco: McGraw-Hill, 1968.
Tsuchunko, J. F. A. and Sheehan, P. J. "Aperture Configuration and Imaging Performance," Applied Optics, 10, No. 6, 1432-1438, Jun. (1971).

Primary Examiner—David C. Nelms
Assistant Examiner—Que Tan Le
Attorney, Agent, or Firm—Gerald B. Hollins; Donald J. Singer

[57] ABSTRACT

A plurality of subaperture arrays which may be disposed within the diameter of the conventional single large aperture in order to achieve improved sidelobe energy characteristics with respect to that of the single large aperture. The apertures may be embodied as optical sources or radio frequency energy sources. The preferred arrangements of the subapertures include dispositions on concentric circles circumscribed within the single large aperture with a single aperture at the center of the large aperture and six, twelve, eighteen, twenty four and so on subapertures disposed on each subsequent concentric circle. One particularly attractive subaperture arrangement includes a total of nineteen subapertures with the outer concentric circle twelve of these subapertures being slightly rotated with respect to those of the inner concentric circles.

20 Claims, 11 Drawing Sheets

U.S. Patent        Oct. 30, 1990        Sheet 1 of 11        4,967,077 a) Field amplitude of outer ring of 19 aperture array
b) Summation of field amplitudes from inner and outer rings of 19 aperture array
c) Resultant field amplitude from summation of all 19 apertures.

( O = THEORETICAL VALUES; X = EXPERIMENTAL VALUES WITH ASSOCIATED UNCERTAINTIES )

MULTIPLE APERTURE ARRAYS FOR OPTICAL AND RADIO FREQUENCY SIGNALS

RIGHTS OF THE GOVERNMENT

The invention described herein may be manufactured and used by or for the Government of the U.S. for all governmental purposes without the payment of any royalty.

BACKGROUND OF THE INVENTION

This invention relates to the field of electromagnetic energy aperture arrays that are useable in the communication of optic and radio frequency signals, particularly to arrays of reduced sidelobe energy content.

Large diameter radio frequency antennas or optical radiators offer desirable signal characteristics for use in weapons systems, outer space astrophysical observation equipment and in other electromagnetic radiation systems. The physical size and weight attending such large diameter apertures is often, however, prohibitive in view of the physical constraints imposed by the operating environment of many using systems. The transportation of a 20 foot diametered microwave antenna into outer space or the battlefield use of a laser target illuminator which includes a 10 foot diametered optical reflector can be understood to be physically attainable but attended by practical complexities and undesirable complications. Severe aperture size limitations also frequently arise in systems which are required to perform high rate angle tracking, i.e. in system such as anti-aircraft fire control radars.

A possible resolution to these aperture difficulties lies in the use of an array of physically smaller apertures which cooperate to provide an electromagnetic signal of similar or even improved characteristics over that which attends the single large aperture arrangement.

In the case of microwave antennas as might be employed in a high powered microwave (HPM) weapon or also in the case of such apparatus as a microwave target illuminating system, it is desirable to maximize the energy delivered to a central target from a high gain antenna. Such antennas often include a parabolic dish that is disposed in a cassegrain configuration—an antenna arrangement wherein the energy source is mounted at the focal point of a reflector and aimed toward the reflector in order to reflect a maximum amount of energy to the target and realize minimal energy incidence on angularly adjacent non-target areas.

In the weapons environment, the presence of undesirable sidelobe energies can easily lead to fratricide, the subjection of friendly forces to unintended damage through sidelobe illumination of objects that are located in small angular separation from an intented target. The use of small subaperture antennas as described herein-apertures that are driven from phase-locked energy sources and have known main lobe to sidelobe ratios can provide HPM radiation patterns having a minimal probability of damage to unintended objects. In the present invention it is assumed that the desired subaperture array is to be inscribed within the physical confines of the replaced larger circular aperture with the number of subapertures and their physical disposition being selected to optimize the attained illumination energy pattern.

In describing the performance of the herein disclosed multiple subaperture arrays it is convenient to compare energy distribution patterns with the far-field Airy pattern of an equivalently diametered single aperture array, an array which corresponds to the single antenna dish or a single optical collector. Moreover in the optical environment, the performance of single aperture and multiple subaperture systems can be compared on the basis of far field impulse responses of the single aperture and multiple aperture arrays.

As one means of evaluating the performance of multiple subaperture systems and comparison with a single apertured system according to this arrangement, one can consider the single aperture central lobe width of an imaged point source with respect to the central lobe width of an imaged point source arising from the multiple subaperture configuration being considered. The subaperture performance is considered to be good when the central lobe width of its imaged point source is equal to or less then that of that of the single large aperture arrangement. Good performance is also characterized by secondary irradiance maxima which are less than 0.0175 of the central lobe peak irradiance.

The prior patent art indicates significant attention of inventors to the use of multiple aperture arrays and improvement of their main lobe and sidelobe energy distributions for a variety of electromagnetic systems. In the radio frequency antenna art, for example, the patent of H. Yagi U.S. Pat. No. 1,860,123 reveals the use of a plurality of spatially oriented antenna elements in an electric wave generating apparatus. The patent of E.A. Ohm. U.S. Pat. No. 4,236,161, also teaches the use of antenna apertures which are arranged in plural groups of seven antennas. Some of the Ohm antennas in each group are common to multiple groups.

In the optics art, patent of E.E. Hadley. U.S. Pat. No. 3,502,387, shows a plurality of telescopes having multiple primary mirrors whose fields of view overlap. In the Hadley patent, an overlapping display provides a single image with a larger field of view—an arrangement which is illustrated in FIG. 6 of the Hadley drawings.

Also in the optical art, the patent of J.S. Fender et al, U.S. Pat. No. 4,639,586, shows the use of phased apertures in a laser transmitter apparatus. FIG. 16 in particular shows a seven element phased array of telescopes. The patent of A. Wirth et al, U.S. Pat. No. 4,725,138, is concerned with a wave front sensor in which the wave front is divided into a plurality of subapertures and passed through a filter array 10 which comprises a mask having as many mask cells as subapertures and also having a lenslet lit array 12 which is used to divide the input pupil into subapertures.

In the acoustic art, the patent of O.H. Schuck, U.S. Pat. No 2,837,728, teaches the use of acoustic transducer elements which are placed in a predetermined concentric circle array pattern. An underwater transducer of the sonar type is one possible use of the Schuck apparatus.

None of these prior art patent references, however, teaches the arrangement of subaperture elements as set forth in the instant invention.

SUMMARY OF THE INVENTION

In the present invention an array of electromagnetic wave aperture devices are disposed according to a pattern of concentric circles that are received internally of the diameter of a related and to-be replaced large circular aperture. The small or subapertures of this array are to be fed by perfectly phased signals while the disposition of the apertures arranged to control the sidelobe energy distribution is in the impulse response of the array. The main lobe and sidelobe energies of the array response are more favorably disposed then in the Airy pattern of the related single large aperture. Bidirectional or either transmitting or reception use of the aperture array is contemplated.

It is an object of the present invention therefore to provide an aperture apparatus which provides reduced impulse response pattern sidelobe energy content with respect to a single aperture of equal overall diameter.

It is another object of the invention to provide such an apparatus in a plurality of forms—which may be configured for use at radio frequencies or optical frequencies.

It is another object of the invention to provide a multiple aperture arrangement which may be more conveniently physically configured for military and space uses in comparison with the equivalently sized single aperture.

It is another object of the invention to provide a plurality of subaperture arrangements which each have different number of component subaperture elements.

It is another object of the invention to provide two subaperture arrangements of the same subaperture count but different subaperture physical arrangements wherein one arrangement achieves improved impulse response over the other.

It is another object of the invention to provide a physical arrangement for a plurality of arrayed radio frequency antenna elements.

It is another object of the invention to provide a physical arrangement for a plurality of optical energy disseminating elements that are arrayed into a predetermined physical pattern.

It is another object to the invention to provide a multiple apertured array which may have a total of 19, 37, 61, 91, 127 and so-on total number of subarray elements.

It is another object of the invention to provide an aperture subarray arrangement wherein the subapertures are disposed on concentric circles with each successive concentric circle having six more subapertures than the preceeding smaller diametered concentric circle.

Additional objects and features of the invention will be understood from the following description and the accompanying drawings.

These and other objects of the invention are achieved by an electromagnetic wave generating multiple aperture apparatus comprising the combination of a centrally located circular aperture of predetermined diameter d, said centrally located aperture being centered at the origin of a coordinate axis set; a sextet of additional circular apertures each of diameter d and centered on a first circle concentric of said origin and said first aperture with each first concentric circle aperture being in substantial contiguity with said first aperture and with the latterally adjacent first concentric circle apertures, said sextet of first concentric circle apertures being also disposed along equally spaced radial vectors originating in said origin and interrupting said first circle at six equal intervals; a plurality of additional circular apertures each of diameter d disposed along subsequent circles concentric of said origin and the preceeding concentric circles with each subsequent circle aperture being in substantial contiguity with the adjacent most aperture of the preceding circle and with the adjacent subsequent concentric circle apertures, said subsequent circle at equal arc intervals with said concentric circles being N in number and with the number of apertures in each said subsequent concentric circle being six greater than the number in the preceeding concentric circle and with the total number of apertures being a number taken from the mathematical series 19, 37, 61, 91, 127 and so forth in response to the number N of concentric circles.

DETAILED DESCRIPTION

Figure 1:
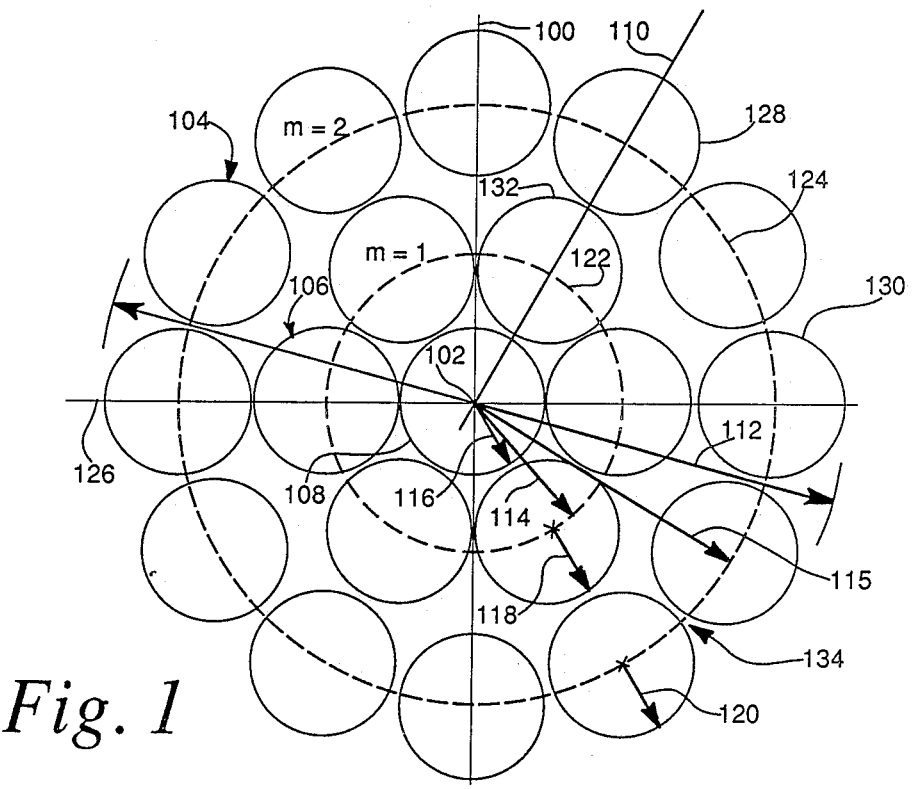
FIG. 1 shows one aperture arrangement according to the invention.

FIG. 1 in the drawings shows one arrangement of a subaperture array or system which is inscribed within the diameter 112 of a larger apertured single aperture system. The FIG. 1 arrangement of subapertures includes a total of 19 subapertures that are disposed in concentric circle alignment around a central subaperture 108 with the concentric circles being indicated at 122 and 124 and the origin or center of the concentric circles being indicated at 102.

According to the preferred arrangement of the FIG. 1 subapertures in the present invention, the innermost subaperture 108 is centered at the origin 102 of the coordinate axis set 100 and 126. The first ring of subapertures 106 in FIG. 1 have their centers in turn disposed along an innermost concentric circle 122 which is also centered at the origin 102. Each of the subapertures in this first ring is in contiguous or touching relationship with the central subaperture 108 and also with the adjacent subapertures on the concentric circle 122. The second ring of subapertures 104 includes alternate subapertures such as indicated at 128 and 130 that are aligned radially with the adjacent-most subapertures of the first ring, the alignment radius of the subaperture 128 with the first ring subaperture 132 being indicated at 110 in FIG. 1.

The radius of the subapertures located at the origin and in each of the concentric circles 122 and 124 is indicated at 116, 118 and 120 respectively according to the preferred arrangement of the FIG. 1 subapertures. The radii 116, 118 and 120 are of equal length, that is the subapertures at the origin and on the two concentric circles 122 and 124 are all of equal size. The radius of the concentric circle 122 is indicated at 114 in FIG. 1. By geometric intuition this radius 114 is of twice the length of an individual aperture radius, such as the radius 116 and the radius 115 is four times the length of the individual aperture radius 116.

According to further geometric consideration prevailing in the FIG. 1 subaperture array, the subapertures 108, 132 and 128 along the alignment radius 110 are arranged to be physically contiguous or geometrically tangent in physical disposition and the subapertures centered on the concentric circles 122 and 124 are made to be as nearly in physical touching or geometric tangent relationship as is practically possible. As is illustrated by the gap 134 and as can be demonstrated by geometric manipulation, however, the subapertures centered on the concentric circle 124 are in fact separated by a small gap or inter aperture space. By similar geometric reasoning it can be shown that the subapertures on the concentric circle 122 are also separated by a small inter subaperture gap. For convenience in the description herein (and in view of the remote effect of the gaps 134 on the electromagnetic wave properties of the FIG. 1 subaperture array) the subapertures in FIG. 1 will be referred to herein as being substantially contiguous or tangent or touching in both the radial and circumferential directions.

The subapertures in the FIG. 1 array have the physical significance of being either energy sources or reflectors cooperative with energy sources that are located, for example, above the plane of the FIG. 1 subapertures In the case of radio frequency energy systems the subapertures of FIG. 1 might, for example, represent parabolic or other geometrically shaped reflector dishes while in the case of optical frequency systems or laser apparatus, the subapertures of FIG. 1 may represent energy output sources. In each of these exemplary cases, the phase relationship between the energy signals supplied at each of the subapertures of FIG. 1 is presumed to be ideal and the signals supplied to the apertures are presumed to be linearly polarized and the subapertures are presumed to be in perfect alignment. Additional details regarding the signal related aspects of the FIG. 1 aperture array are described in connection with FIGS. 3-6 of the drawings below.

It is significant to note that in several of the above referred-to prior patent examples, the energy radiators or other manifestations of the subapertures in the FIG. 1 arrays are shown to be disposed in a collection of seven radiators or seven subapertures that are disposed in the manner of the FIG. 1 subapertures-with centering on a concentric circle and on a central subaperture. In arriving at the presently described invention, consideration of this seven subaperture array has indicated its central lobe and secondary lobe energy distributions to be unsatisfactory for the purposes described herein.

For the sake of consistency in the descriptive language of the present document, it is sometimes convenient to consider the central aperture 108 in FIG. 1 to also reside on a concentric circle—a concentric circle of zero radius located at the origin 102. A circle of zero radius is, of course, one possible description of the point defined by the origin 102 in FIG. 1.

Figure 2:
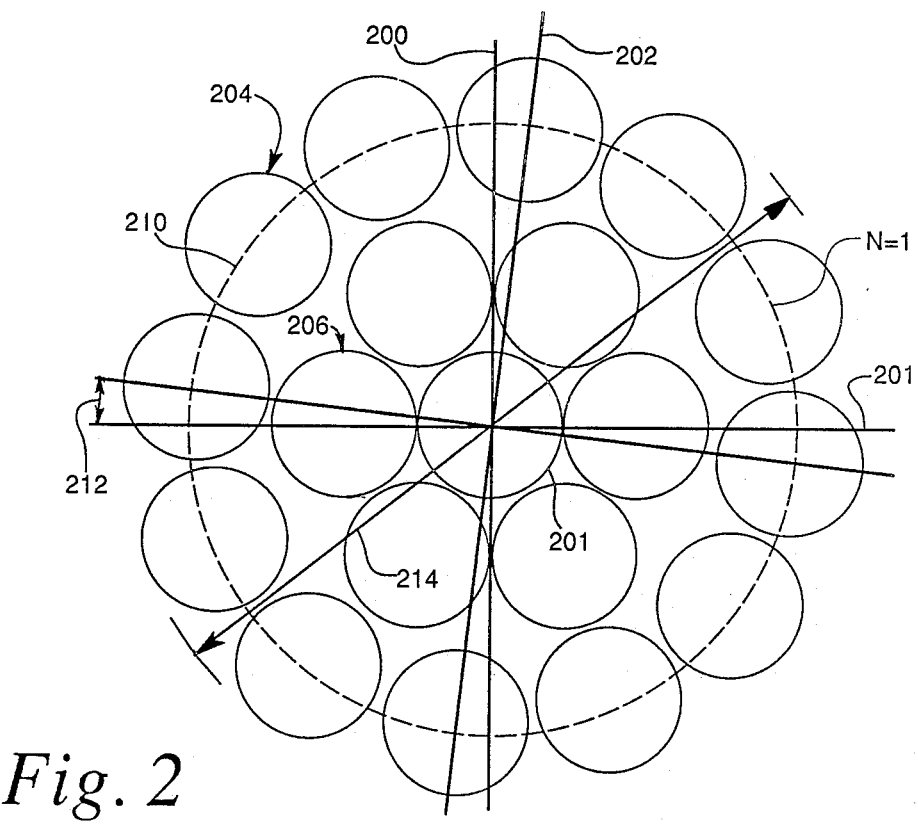
FIG. 2 shows a modified and preferred form of the FIG. 1 aperture arrangement.

For the herein referred to more critical utilizations of a subaperture array the nineteen subaperture array of FIG. 1 and the modifications of this array shown in FIG. 2 are found to be the minimal number of subapertures capable of providing energy distributions that are satisfactory. The addition of subapertures disposed on additional circles that are concentric with the circles 122 and 124, that is the use of arrays having a total of 37, 61, 91, 127 and additional numbers in this numerical series, is also capable of providing main lobe and secondary lobe energy distributions that are satisfactory for the present uses. The effect of these larger numbers of subapertures on the array impulse response and energy distribution is described in connection with the drawings of FIGS. 3-8 herein.

FIG. 2 in the drawings shows a modified arrangement of the FIG. 1 aperture array in which the outer ring of subapertures 204, that is the apertures centered on the concentric circle 210 are rotationally shifted with respect to the axes pair 200 and 201 and the ring of subapertures 206. The angle by which the outer ring of subapertures 204 is shifted is indicated at 212 in FIG. 2; this angle is preferably arranged to be 6.75 degrees in size. The FIG. 2 aperture array is shown in FIG. 5 of the drawings to provide an especially desirable relationship between main lobe and secondary lobe energy distributions. The FIG. 2 arrangement is therefore notably superior to that of the FIG. 1 aperture array as is also illustrated by the patterns shown in FIG. 3 and FIG. 4 of the drawings. The FIG. 2 aperture array is conveniently called by the name of a nineteen rotated array and is of course presumed to be inscribed within the diameter of the larger single aperture, that is indicated at 214 in FIG. 2.

Figure 3A:
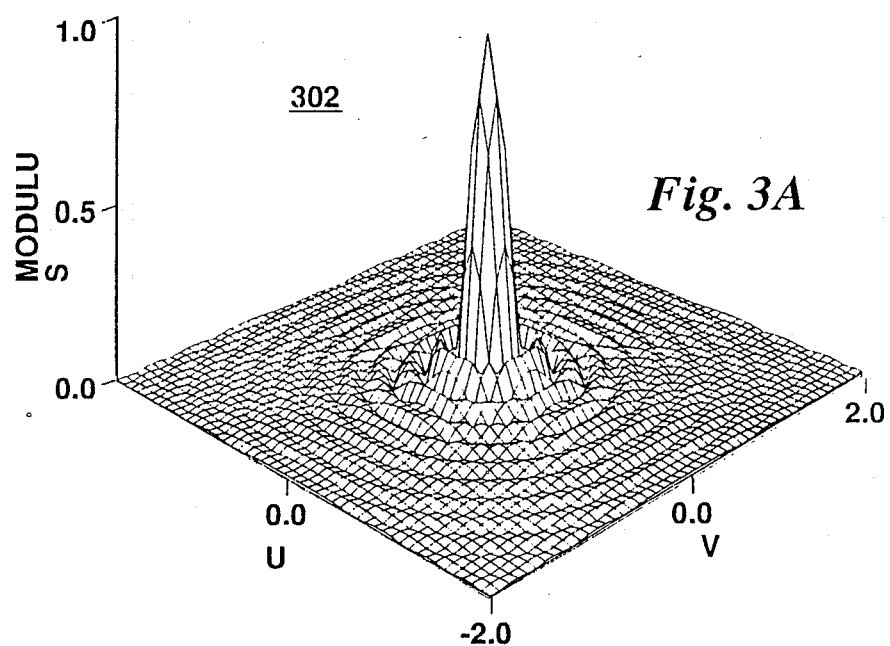
FIGS. 3A, 3B and 3C show three aspects of theoretical and experimental far-field diffraction patterns for a single large aperture.
Figure 3B:
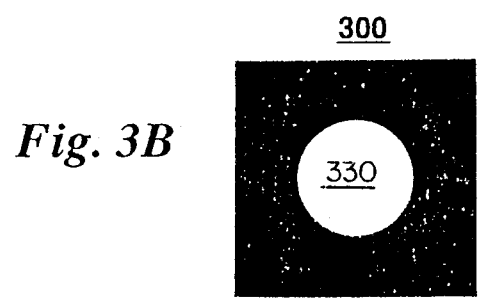
Figure 3C:
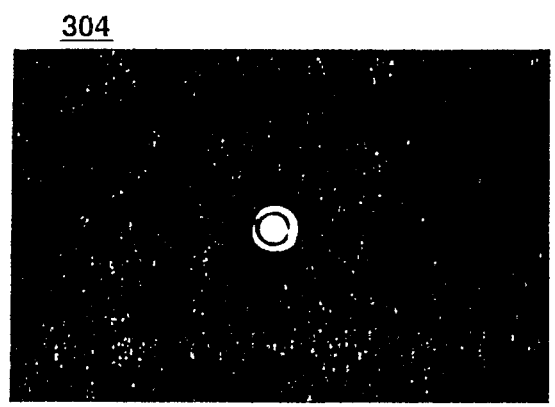

FIG. 3 in the drawings is concerned with three aspects of the conventional single aperture. These aspects include a physical representation of the single aperture configuration at 300 in FIG. 3A—the aperture being indicated at 330 in the view 300: a theoretical far-field diffraction pattern for the single large aperture as shown at 302 in FIG. 3B and an experimental representation of the far-field diffraction pattern shown at 304 in FIG. 3C.

The theoretical basis for using smaller inscribed circular subapertures as a replacement for a single large circular aperture and the properties to be expected from such an array of subapertures can be best appreciated from the mathematical and theoretical considerations underlying the circular subaperture arrays. Other workers in this field including one Toraldo Defrancia have examined the sidelobe and central lobe properties of the far-field diffraction pattern of a single aperture that is surrounded by thin concentric rings; this work appears in the publication "Super Gain Antennas and Optical Resolving Pattern" suppl. A1 Volume IX series IX DelNuovo, Cimento, 426, 1952. In addition J.F.A Tschunko and P.J. Sheehan have reported in the publication "Aperture Configuration and Image Performance" which appears in the periodical *"Applied Optics"*, Volume ten number six pages 1432-1438 of June, 1971, nineteen element subaperture arrays that are configurated in a physical arrangement differing from that of the present invention—including examinations of the radial energy distribution and the Modulation Transfer Function Properties of such systems. The mathematical and theoretical foundation of the present invention array arrangements may therefore be appreciated from the following theoretical considerations.

A comparison of the FIGS. 3-6 aperture arrays may be accomplished by examining the far-field diffraction patterns produced by imaging a point source through each of these multi-aperture systems. The following expression may be used to calculate the diffraction patterns:

$$h(u,v) = 2\pi a^2 J_1\left[\frac{(u^2+v^2)^{\frac{1}{2}}}{(u^2+v^2)^{\frac{1}{2}}}\right] \times \sum_{n=1}^{N} \exp[-i(up_n\cos\theta_n + vp_n\sin\theta)/a] \quad (1)$$

In this expression "a" is the radius of each of the subapertures; N is the number of apertures in the system, $\theta n$. is the angular position of each aperture in degrees from the x axis; $P_n$ is the radial distance of the nth subaperture from the origin of the system and is expressed in terms of multiples of the subaperture radius; and u and v are the coordinate in the image plane.

The expression for h(u, v) is the impulse response which is proportional to the Fourier transform of the transmittance of the exit pupil of the multiple aperture system. The exit pupil can be expressed as the convolution of one aperture with an array of delta functions which describe the location of the centers of each aperture. The subapertures which are contained within each multi-aperture are identical.

Equation (1) is a generalized expression for the impulse response of any multi-aperture system which contains identical circular subapertures. This equation may be used to form a subset of equations which describe the impulse responses of multiple rings of identical circular subapertures.

In identifying an expression for the generalized subaperture radii for any system of multi-apertures arranged in concentric rings to just fit inside a single large aperture, of radius $a_{ref}$ the radius of each subaperture comprising the concentric ring multi-aperture system may be described as:

$$a = \frac{a_{ref}}{(2)(\text{rings}) + 1} \quad (2)$$

where: rings=number of rings which comprise the multi-aperture system.

$a_{ref}=\frac{1}{2}$ the diameter 112 in FIG. 1
a=radius 16=118=radius 120 in FIG. 1

The radial distance from the origin to the circle on which the centers of the subapertures of a particular ring are placed, $P_m$ can be generalized. "m" represents a particular ring beginning with m=1 as the ring closest to the origin at a subaperture radius of 2a; m=2 as the next ring with a radial distance of 4a, etc. For any ring $P_m$ may be expressed as:

$$P_m = 2ma \quad (3)$$

Substituting equation (2) into (3) yields:

$$P_m = \frac{2ma_{ref}}{(2)(\text{rings}) + 1} \quad (4)$$

For each ring, there is an associated number of apertures that can fit without overlap. The number of apertures for each ring can be described by:

$$\#\text{ring}_m = m6 \quad (5)$$

There is also a definite relationship between each ring and the apertures that comprise that ring. Since each larger ring has six more apertures than the preceding ring, the angular spacing between each aperture in each ring can be expressed as:

$$\theta\text{ring}_m = 360°/m6 = 60°/m \quad (6)$$

Therefore, the location of each aperture in a particular ring may be generalized as:

$$\theta_{m6} = \theta_i + [m6-1]\theta_2 \quad (7)$$

where $\theta_i$ is the angular location of any single aperture in a particular ring.

Substituting equations (2) and (3) into equation (1) and letting $u=q\cos\phi$ and $v=q\sin\phi$, the impulse response for each ring is:

$$h_m(q,\phi) = \frac{2\pi a_{ref}^2 J_1[q]}{[(2)(\text{rings})+1]^2 q}\left\{\sum_{n=1}^{N} \exp[-i2mq\cos(\phi-\theta n)]\right\} \quad (8)$$

which describes the impulse response generated by each ring composed of identical circular subapertures. The frequency of the complex field amplitudes generated by each ring is determined by the argument of each exponential. For the rings that are further from the origin, i.e. as 2m increases. the impulse responses exhibit higher frequencies. However, the rings located in proximity to the origin produce lower frequency field amplitudes.

The total impulse response of the multi-aperture system is a summation of the impulse responses complex field amplitudes) of each of the rings. This coherent summation of impulse responses yields the following complex field amplitude at the image plane:

$$U(q,\phi) = H_O(q,\phi) + h_1(q,\phi) + h_2(q,\phi) + \ldots + h_m(q,\phi) \quad (9)$$

where $h_O(q,\phi)$ is the impulse response for the single aperture located at the origin. The irradiance for each diffraction pattern is expressed as:

$$I(q,\phi) = U(q,\phi)U^*(q,\phi) \quad (10)$$

Equations (8), (9), and (10) form the basis for the calculations of the far-field diffraction patterns which, in turn, are used to determine the performance of the concentric ring multi-aperture systems.

Multi-aperture systems having impulse responses characterized by maximum sidelobe irradiances that are less than that of a single large aperture; i.e. 0.0175 of the main lobe irradiance are desired for the uses described above herein. In addition, the resulting diffraction patterns should have central lobe widths which are equal to or less that of a single large aperture of equivalent diameter. Although not one of the performance criteria, the percentage of irradiance in the central lobe of these patterns is also considered.

Figure 4A:
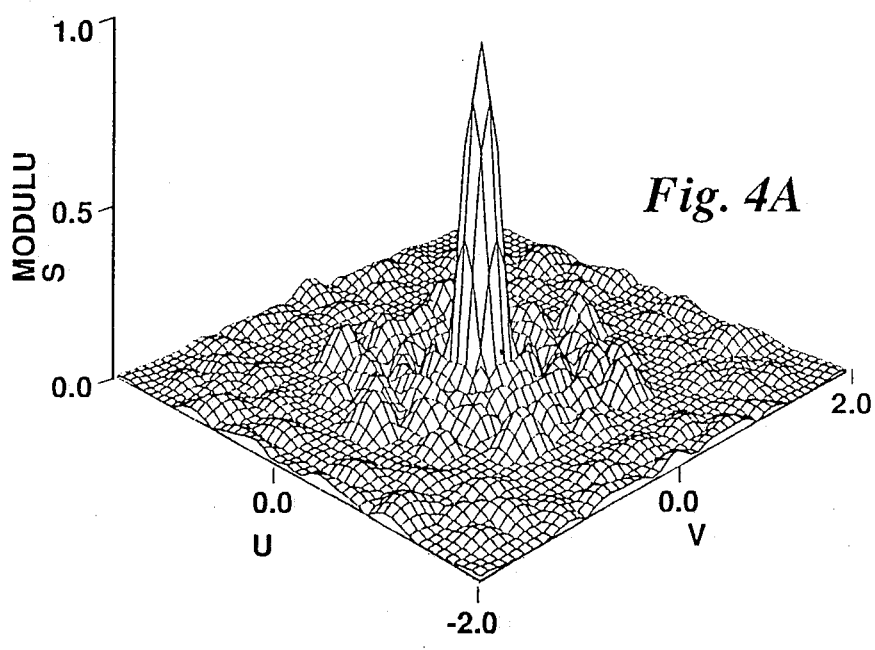
FIGS. 4A, 4B and 4C show three aspects of theoretical and experimental far-field diffraction patterns for a nineteen subaperture array.
Figure 4B:
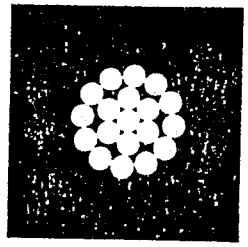
Figure 4C:
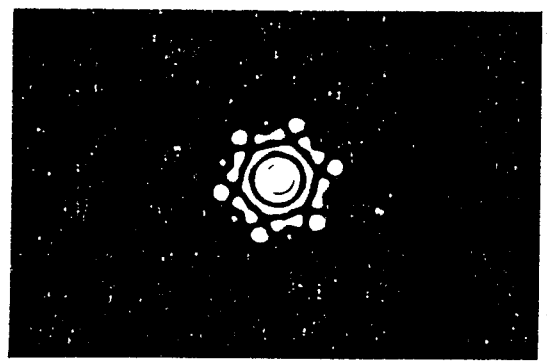
Figure 5A:
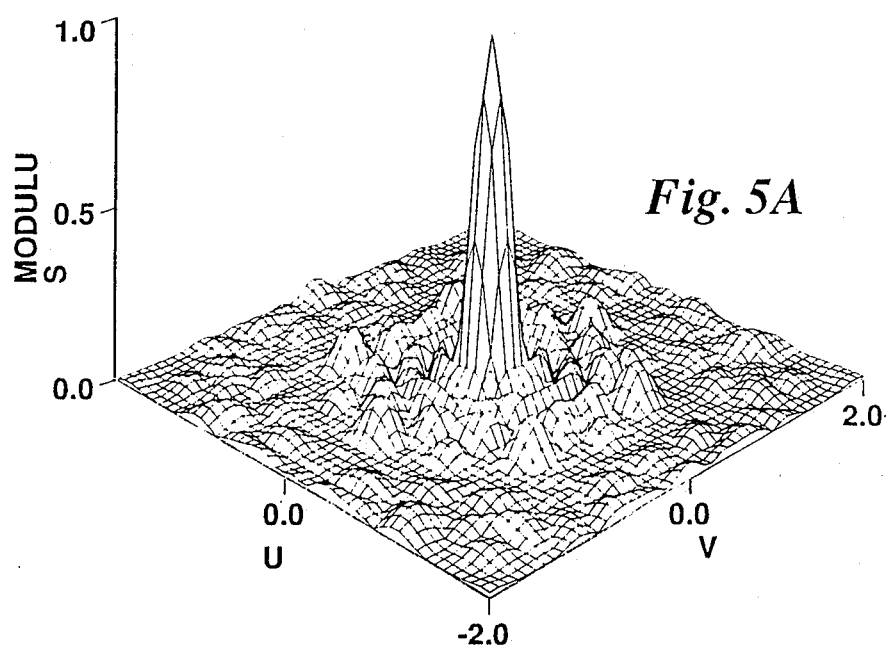
FIGS. 5A, 5B and 5C show three aspects of theoretical and experimental far-field diffraction patterns for a nineteen subaperture array wherein the outside ring of subapertures is rotated.
Figure 5B:
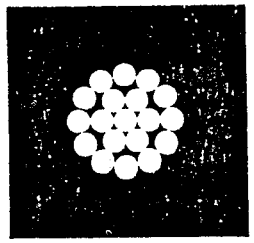
Figure 5C:
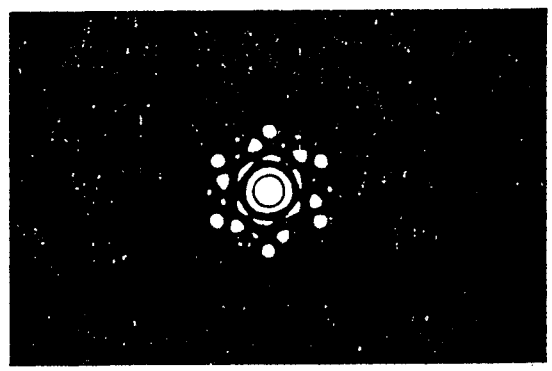
Figure 6A:
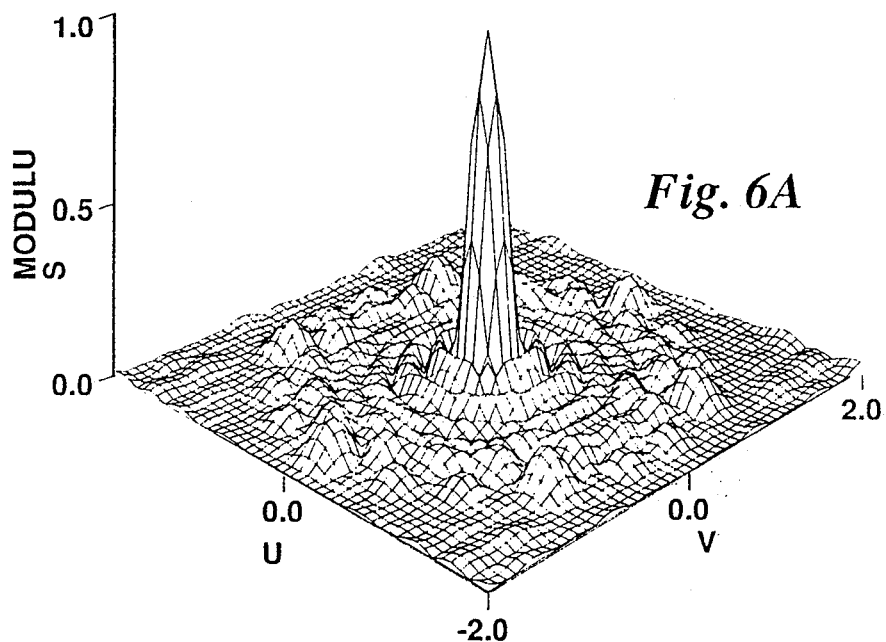
FIGS. 6A, 6B and 6C show three aspects of theoretical and experimental far-field diffraction patterns for a thirty seven subaperture array.
Figure 6B:
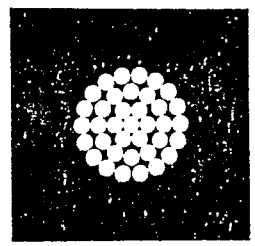
Figure 6C:
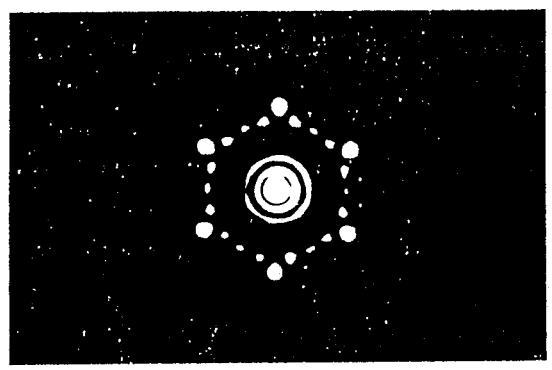
Figure 7A:
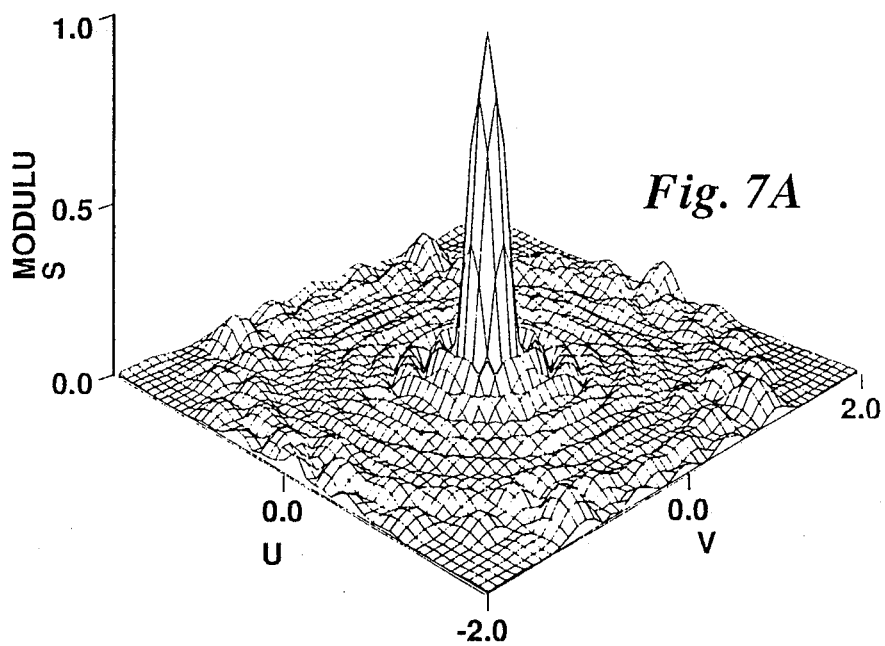
FIGS. 7A, 7B and 7C show three aspects of theoretical and experimental far-field diffraction patterns for a sixty one subaperture array.
Figure 7B:
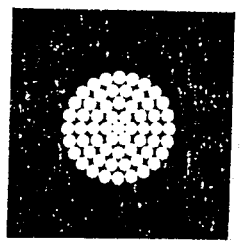
Figure 7C:
Figure 8A:
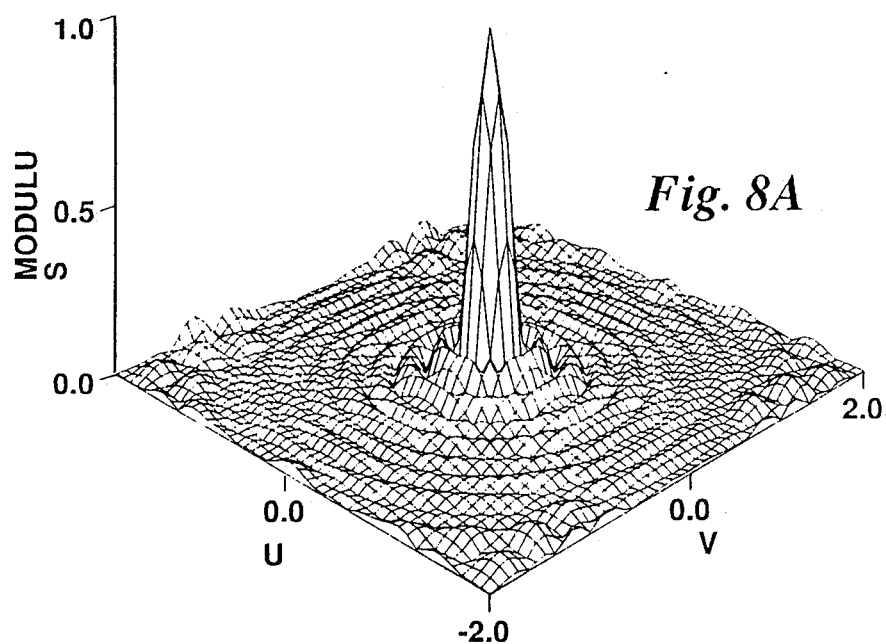
FIGS. 8A, 8B and 8C show three aspects of theoretical and experimental far-field diffraction patterns for a ninety one subaperture array.
Figure 8B:
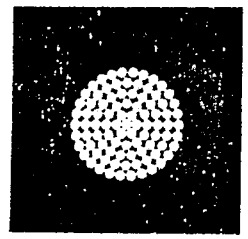
Figure 8C:

Each subaperture system in FIGS. 4-8 is comprised of concentric rings of identical subapertures with a single subaperture at the origin of the system. The multi-aperture systems are comprised of 19, 37, 61, and 91 subapertures. respectively. FIG. 4 represents the 19 subaperture system. FIG. 5 is the 19 subaperture system with the outer ring of 12 apertures rotated 6.75° with respect to the inner ring. FIGS. 6, 7 and 8 show the 37, 61, and 91 subaperture systems, respectively. Systems having larger numbers of subapertures according to the mathematical relationship between these numbers are also within contemplation of the invention. In each case the radius of the multi-aperture system is equal to that of the single large aperture of FIG. 3. As a result, each of these systems could just fit inside of the single large aperture.

Since the amount of energy which passes through each aperture system is of importance, the transmittance area of each subaperture system may be calculated and is represented in the following tabulation. The values in this tabulation are normalized such that the single large aperture with an equivalent diameter has 100% transmittance. Using equation (2) and geometric analysis, the total area of transmittance T, for each aperture system is:

$$T_{19} = (a_{ref})^2 \, 19/25 = T_{ref}(.760) \quad (11)$$

$$T_{37} = (a_{ref})^2 \, 37/49 = T_{ref}(.755) \quad (12)$$

$$T_{61} = (a_{ref})^2 \, 61/81 = T_{ref}(.753) \quad (13)$$

$$T_{91} = (a_{ref})^2 \, 91/121 = T_{ref}(.752) \quad (14)$$

where $T_{ref} = (a_{ref})^2$ is the transmittance area of the single large aperture and $T_{19}$, $T_{37}$, $T_{61}$, and $T_{91}$ are the transmittance areas of the 19, 37, 61, and 91 aperture systems, respectively. The 19 aperture system has the greatest amount of transmittance, 76.0%, with respect to the single large aperture.

FIGS. 3 through 8 in the drawings show the calculated and experimental diffraction patterns for several subaperture systems. For each subaperture system, the calculated modulus (the square root of the irradiance) of the far-field diffraction pattern (impulse response) is displayed. The modulus is displayed for each subaperture system in order to enhance the structure of the sidelobes.

The upper left-hand corner or the B FIG. portion of FIGS. 3 through 8 shows the aperture system which generated the associated impulse response. The view in the upper right-hand corner or "C" FIG. portion in FIGS. 3 through 8 is the experimental diffraction pattern for the same aperture system. These views can be interpreted as a top-down view of the experimental response function—a function which is, of course, similar to the theoretical response function. These photographs views are therefore a display of all modules values which are above a given threshold value. The photographs confirm the theoretical predictions as displayed by the theoretical plots.

The maximum central lobe value for each diffraction pattern in FIGS. 3-8 is normalized to a value of 1.00. Since a certain percentage of energy is inherently stopped at the multi-aperture system, a theoretical examination may be used to determine the maximum central lobe irradiance values of each multi-aperture system. A generalized expression may in fact be derived for any system containing concentric rings of identical circular subapertures as follows.

For the single large aperture of radius = $a_{ref}$, the impulse response, assuming a unit amplitude plane wave illumination, (referring to equations (8) and (9)), is:

$$U_{ref}(q) = 2\Box(a_{ref})^2 J_1(q)/q \quad (15)$$

Using the Bessel function expansion:

$$J_1(q) = q/2 - q^4/2^3 1!2! + q^5/2^5 2!3! - q^7/2^7 3!4! + \quad (16)$$

Substituting $T_{ref}$ for $\Box(a_{ref})2$, the impulse response becomes:

$$U_{ref}(q) = 2T_{ref}[\tfrac{1}{2} - q^2/16 + q^3/384 - \ldots \quad (17)$$

The maximum central lobe value is located at $q=0.0$. Therefore, the value of the impulse response at $q=0.0$ is:

$$U_{ref}(0) = \frac{2T_{ref}}{2} = T_{ref} \quad (18)$$

This central lobe value of the complex field amplitude is equal to the transmittance area of the single large aperture radius $a_{ref}$.

The irradiance of the central lobe is:

$$I_{ref}(0) = U_{ref}(0, 0)U_{ref}^*(0, 0) = (T_{ref})^2 \quad (19)$$

For the 19 aperture system comprised of apertures with radii equal to that described in equation (2), the complex field amplitude (equation (8) and (9)) yields:

$$U_{19}(q,o) = 2\pi (a_{ref}/5) \, 2J_1(q)/q \, \{1 + \quad (20)$$

$$\sum_{n=1}^{6} \exp[-i2q\cos(\theta - \theta_n)] + \sum_{n=1}^{12} \exp[-i4q\cos(\phi - \theta_n)]\}$$

Using the same Bessel function expansion and substituting $q=0.0$ yields the following impulse response:

$$U_{19}(0, 0) = \pi(a_{ref})^2(19)/25 = T_{19} \quad (21)$$

which is the transmittance area for the 19 subaperture system.

The maximum central lobe irradiance for the 19 subaperture system is:

$$I_{19}(0, 0) = U_{19}(0, 0)U_{19}^*(0, 0) \quad (22)$$

Substituting equation (21) into (22) yields:

$$I_{19}(0, 0) = (T_{19})^2 \quad (23)$$

which demonstrates that the maximum central lobe value for the 19 subaperture system is equal to the square of the transmittance area (assuming unit amplitude plane wave illumination).

Substituting equation (11) into equation (23) results in:

$$\begin{aligned} I_{19}(0,0) &= (T_{ref})^2(.760)^2 \\ &= (T_{ref})^2(.58) \end{aligned} \quad (24)$$

The ratio of the central lobe values of the single large aperture and 19 subaperture system is:

$$\frac{I_{19}(0,0)}{I_{ref}(0,0)} = \frac{(T_{ref}^2)(.58)}{T_{ref}^2} = .58 \quad (25)$$

which is equal to the square of the transmittance value indicated in the above tabulations.

A similar analysis is possible for any system of multi-aperture systems composed of concentric rings of identical circular subapertures illuminated by a unit amplitude plane wave. Combining equations (8) and (9) and expanding, as in equation (20), results in:

$$U_{\#sub}(q,\phi) = (T_{sub})2J_1(q)/q \{1 + \quad (26)$$
$$\sum_{n=1}^{6} \exp[-i2q\cos(\phi - \theta_n)] + \sum_{n=1}^{12} \exp[-i4q\cos(\phi - \theta_n)]\}$$

where #sub is the number of subapertures in the system and $T_{sub}$ is equal to the transmittance area of any single subaperture. Using the Bessel function expansion and setting $q=\phi=0.0$, the field amplitude becomes:

$$U_{\#sub}(0,0) = T_{sub}(\#sub) \quad (27)$$
$$= T_{\#sub}$$

which is the transmittance area for the generalized multi-aperture system. The irradiance becomes:

$$I_{\#sub}(0, 0) = (T_{\#sub})^2 \quad (28)$$

which indicates that the maximum central lobe irradiance value of any multi-aperture system composed of concentric rings of identical circular subapertures is equal to the square of the transmittance area of that particular system.

Using these same arguments, the maximum central lobe irradiance of other multi-aperture systems described herein as compared to that of a single large aperture of equivalent diameter, equals the percentage of transmittance area of the respective systems.

Each of the diffraction patterns may be analyzed to determine the central lobe width and compared with the central lobe width of the single large aperture impulse response. The theoretical and experimental data indicate that the central lobe widths are equal. The subaperture systems generate the following central lobe diameters as measured with a linear detector array:

| | |
|---|---|
| $D_1$ | = 45.7 ± 2.0 μm |
| $D_{19}$ | = 45.5 ± 2.1 μm |
| $D_{19R}$ | = 44.9 ± 2.2 μm |
| $D_{37}$ | = 45.6 ± 2.0 μm |
| $D_{61}$ | = 45.3 ± 2.0 μm |
| $D_{91}$ | = 45.0 ± 2.2 μm | where $D_1$ is the central lobe width generated by the single large aperture and $D_{19}$, $D_{19R}$, $D_{37}$, $D_{61}$, $D_{91}$ are the central lobe widths generated by the 19, 19 rotated, 37, 61, and 91 subaperture systems respectively.

The sidelobe patterns and maxima may also be analyzed. Details of the sidelobe structure are depicted in the calculated modulus diffraction patterns of FIGS. 3–8. As the number of subapertures increases from 19, the structured sidelobes, evidenced by the pronounced peaks, moves further from the central lobe. The irradiance of these structured lobes decreases as the number of subapertures increases. As the number of subapertures approaches 91, the diffraction patterns more closely resemble that of the Airy pattern depicted in FIG. 3.

In all of the subaperture arrays described herein, the irradiance sidelobe maxima of the multi-aperture systems are less than those of the Airy pattern value of 0.0175. For the 19 aperture systems, the maximum sidelobe values are located at the prominent peaks of the structured sidelobes. The 19 subaperture system with the outer ring of subapertures rotated 6.75° with respect to the inner ring exhibits the lowest sidelobe maxima. The addition of the fields from the two rings of subapertures, with a relative rotation between the rings, and the center subaperture is such that the irradiance of the structured sidelobes is reduced.

Figure 9:
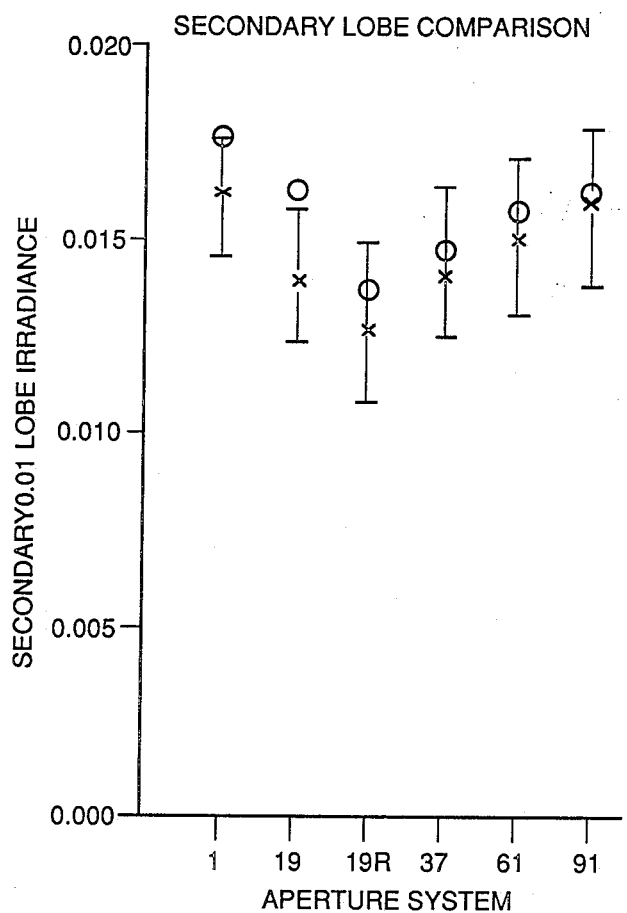
FIG. 9 shows a comparison of secondary lobe irradiance or energy content value for several subaperture systems.

As the number of subapertures increases, the irradiance of the sidelobe disk nearest the central lobe increases. For the 37, 61, and 91 subaperture systems, the maximum sidelobe values are located in these disks. As is illustrated in FIG. 9, when the number of subapertures increases, the value of the first sidelobe disk approaches the value of the first sidelobe disk of the Airy pattern.

Figure 10:
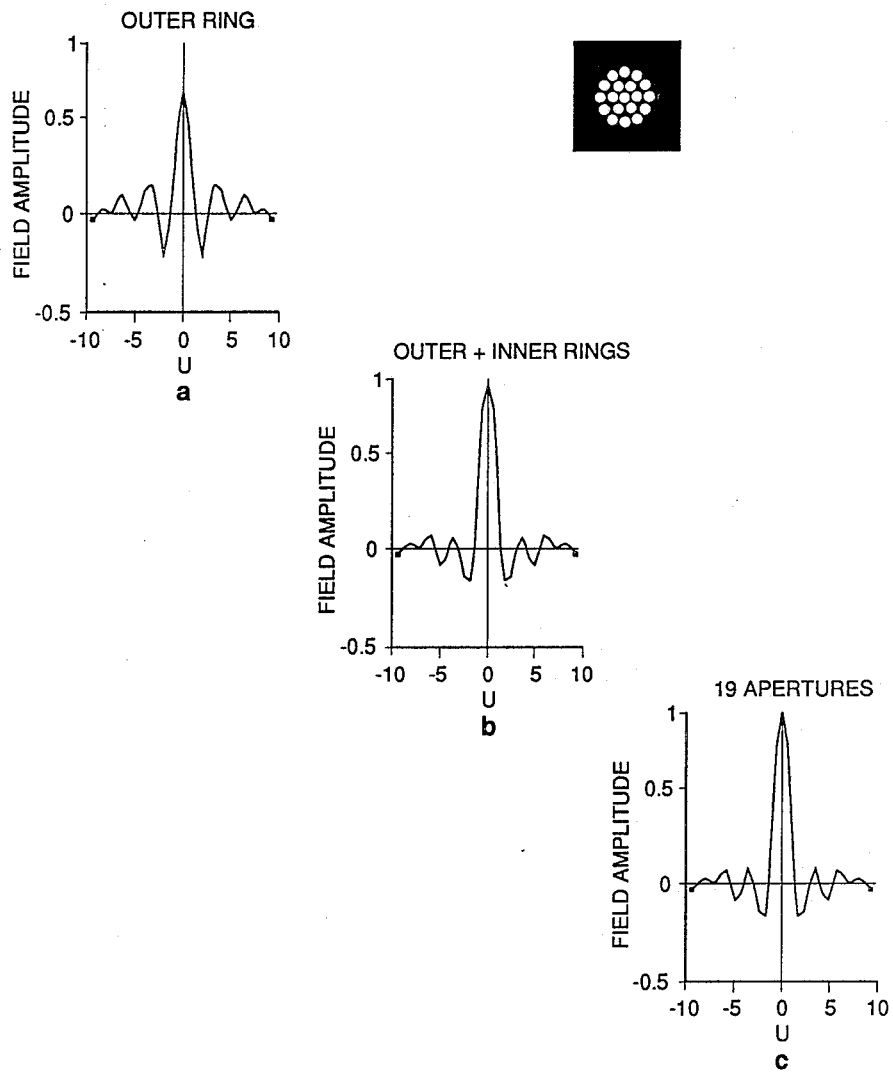
FIG. 10 shows a plurality a field amplitude plots and their summations and relates to the nineteen subaperture system.

FIGS. 10a through 10c illustrate the reason for the reduced sidelobe irradiance values for these particular configurations of the subapertures. The FIG. 10 nineteen—subaperture system is used to illustrate this effect. FIG. 10a is the calculated field amplitude in the far-field due to the outer ring composed of 12 subapertures. The large amplitude of the sidelobes notable in FIG. 10a FIG. 10b represents the addition of the field amplitudes from the outer (12 subapertures) and inner (6 subapertures) rings. The amplitudes of the sidelobes are substantially reduced compared to those generated by the outer ring alone. FIG. 10c is the field amplitude generated by all 19 subapertures. The sidelobe heights are considerably less than that generated solely by the outer ring.

Figure 11:
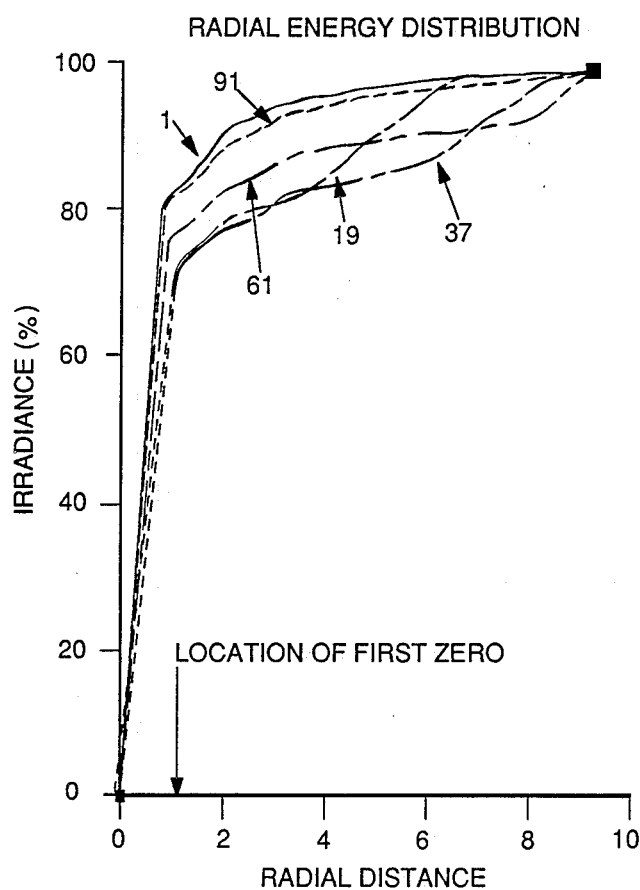
FIG. 11 shows a radial energy distribution plot for a single large aperture and a plurality of different subaperture arrays.

FIG. 11 in the drawings shows the percentage of energy contained within the central lobe of each of the impulse responses generated by the multi-aperture systems considered herein. FIG. 11 represents the theoretical results of the calculated radial energy distributions for both the single large aperture and the multi-aperture systems. In each case, the radial energy distribution is computed and normalized for each of the theoretical diffraction patterns in FIGS. 3–8.

The results depicted in FIG. 11 indicate that as the number of apertures increases, the percentage of irradiance contained in structured sidelobes decreases. The rapid increase of the slope of the radial energy curves, past the location of the first zero, indicates the radial distance where the structured sidelobes are located. As depicted in FIG. 11, the structured lobes for the 19 aperture system, as compared with the other multi-aperture systems, are closer to the central lobe. This observation can be confirmed by noting the structured sidelobe locations in FIG. 3–8.

Figure 12:
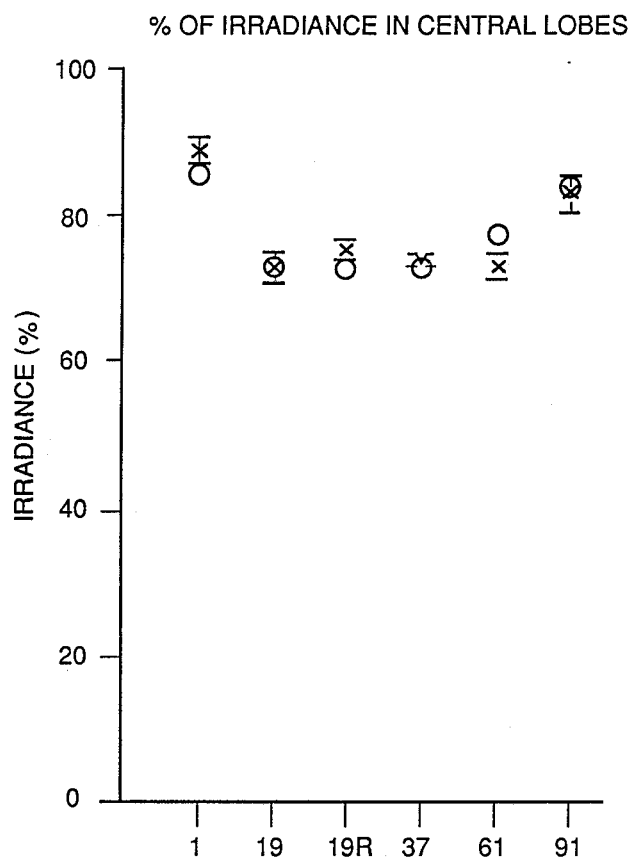
FIG. 12 shows a comparison of central lobe irradiance values.

As the number of apertures increases, the percentage of irradiance in the sidelobes decreases; as a result therefore, the percentage of irradiance contained within the central lobes increases. This is illustrated in FIG. 12 where the radial energy distribution curve for the 91 aperture system for instance closely approximates that of the single large aperture system. The curves for the 19, 37, and 61 aperture systems in FIG. 12 exhibit a large percentage of irradiance in the sidelobes.

FIG. 12 depicts both the theoretical and experimental results of measuring the percentage of irradiance contained within the central lobes of each disclosed multi-aperture system. The result in this figure indicate that the percentage of irradiance energy within the central lobe of each multi-aperture diffraction pattern is in fact less than that of a single large aperture. Generally, the percentage of irradiance in the central lobes increases as the number of apertures in the multi-aperture systems increases. The percentage of irradiance in the central lobes of the 19 and 37 aperture systems was 73.1% and 73.2%, respectively and the percentage for the 61 aperture system increases to 77.5%. The central lobe of the 91 aperture system contains 82.8% of the irradiance for the field of view examined. This closely approximates the irradiance contained within the central lobe of the single large aperture (83.8%) with an equivalent diameter.

The described 19, 37, 61 and 91 circular subaperture systems therefore allow approximately 76% irradiance transmittance as compared to the 100% transmittance of a single large aperture. The secondary maxima for each of these systems is however less than that of the single large aperture. The 19 aperture system with the outside ring rotated 6.75° exhibits the lowest maximum sidelobes with a value of 0.0136. In all cases, the impulse response of the multi-aperture systems have central lobe widths equal to that of the single large aperture system. However, the percentage of irradiance contained by the central lobes generated by the multi-aperture systems is less than that of the single large aperture. The 19 and 37 aperture systems exhibit the lowest percentage of central lobe irradiance while the 61 and 91 aperture systems exhibit increased central lobe irradiance values. The percentage of irradiance within the central lobe of the 91 aperture system closely approximates that of the single large aperture system.

It is presumed in these comparisons that the multi-aperture systems are optical in nature and are illuminated with monochromatic light. This can be decerned from the generalization of image plane coordinates for the impulse responses. These generalizations are:

$$u = 2\pi a x_i / \lambda f \text{ and } v = 2\pi a y_i / \lambda f$$

where ($x_i$, $y_i$) are the image plane coordinates, $\lambda$ is the wavelength, and f the distance to the Fourier transform plane or the image plane in this disclosure. Using this generalization allows one to utilize the disclosed information for any wavelength. For example, in the microwave radio frequency regime, antenna patterns can exhibit large sidelobes. The concepts of this disclosure can therefore be used to design microwave and other antenna systems composed of many subapertures (i.e., phased arrays) in order to reduce the sidelobes and, as a result, achieve increased signal to noise ratios. When used for imaging applications, such as Ladar. Radar and telescopes such reduction of sidelobes can improve the two point resolution of a system.

In addition to the multi-aperture approach, one may interpret the disclosed systems as single large apertures that have been apodised. Reducing the transmittance of certain small portions of the aperture to 0.0 will reduce the sidelobe values as compared to that of a single large aperture with no apodization and improve the imaging properties.

Various modifications may be made to the invention as described without departing from the spirit of the invention or the scope of the appended claims.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Electromagnetic wave generating multiple aperture apparatus comprising the combination of:
   a centrally located circular aperture of predetermined diameter d, said centrally located aperture being centered at the origin of a coordinate axis set;
   a sextet of additional circular apertures each of diameter d and centered on a first circle concentric of said origin and said first aperture with each first concentric circle aperture being in substantial contiguity with said first aperture and with the laterally adjacent first concentric circle apertures, said sextet of first concentric circle apertures being also disposed along equally spaced radial vectors originating in said origin and intercepting said first circle at six equal arc intervals;
   a plurality of additional circular apertures each of diameter d disposed along subsequent circles, with each subsequent circle aperture being in substantial contiguity with the adjacent most aperture of the preceding concentric circle and with the radially adjacent subsequent concentric circle apertures, said subsequent circle apertures being disposed along equally spaced radial vectors originating in said origin and intercepting said subsequent circle at equal arc intervals with said subsequent concentric circles being N in number and with the number of apertures in each said subsequent concentric circle being six greater than the number in the preceding concentric circle and with the total number of apertures being a number taken from the series 19, 37, 61, 91, 127 and so forth, in response to the number N of subsequent concentric circles.

2. The apparatus of claim 1 wherein said electromagnetic wave is an optical energy wave and said apertures comprise optical energy communicating apparatus.

3. The apparatus of claim 1 wherein said electromagnetic wave is an electrical energy wave and said apertures comprise radio frequency energy communicating antennas.

4. The apparatus of claim 1 wherein the number of subsequent concentric circles N is one and the total number of apertures is nineteen.

5. The apparatus of claim 4 wherein the outermost concentric circle apertures are twelve in number with alternate ones of said twelve apertures being centered on said first circle intercepting radial vectors in radial alignment with respective apertures of said first concentric circle sextet of apertures.

6. The apparatus of claim 4 wherein the number N has a value of one and the outermost concentric circle apertures are twelve in number with alternate ones of said apertures being centered on radial vectors that are angularly displaced with respect to said first circle intercepting radial vectors.

7. The apparatus of claim 6 wherein said angular displacement has a magnitude of six and three quarters degrees.

8. The apparatus of claim 4 wherein said number N has a value of one and the outermost concentric circle apertures are twelve in number with alternate ones of said apertures being centered on said first concentric circle intercepting radial vectors.

9. The apparatus of claim 1 further including signal conveying means coupled with said apertures for communicating signals in selected to and from direction and in predetermined phase relationships with each of said apertures.

10. The apparatus of claim 1 wherein said number N has a value of two, the outermost concentric circle apertures are eighteen in number, and the total number of apertures is thirty seven.

11. The apparatus of claim 1 wherein said number N has a value of three, the outermost concentric circle apertures are twenty four in number, and the total number of apertures is sixty one.

12. The apparatus of claim 1 wherein said number N has a value of four, the outermost concentric circle apertures are thirty in number and the total number of aperture is ninety one.

13. The apparatus of claim 1 wherein said number N has a value of five, the outermost concentric circle apertures are thirty six in number, and the total number of apertures is one hundred twenty seven.

14. The method for reducing sidelobe energy content in an electromagnetic wave issuing circular aperture apparatus of a given first physical diameter D comprising the steps of:
  substituting for said circular aperture apparatus a plurality of physical smaller circular subapertures receivable within said diameter D;
  disposing said smaller circular subapertures at the intersection of lines radially directed of said aperture D and circles internally concentric of said aperture D, said smaller circular subapertures being also laterally substantially contiguous and equally spaced on each of said concentric circles and being additionally substantially contiguous with the radially adjacent subapertures of the adjacent concentric circles; and
  terminating said smaller circular subapertures in selected signal sourcing and signal sinking means, generating thereby predetermined signal waveform phase interrelationships at said smaller circular subapertures.

15. The method of claim 12 wherein said terminating step includes communicating signal from selected signal sourcing means to said subapertures during transmitting use of said aperture apparatus.

16. The method of claim 14 wherein said terminating step includes communicating signal for said subapertures to selected signal sinking means during reception use of said aperture apparatus.

17. The method of claim 14 wherein said subapertures are disposed on a plurality of concentric circles in the quantity of one, six, twelve, eighteen, and so on per circle, with said concentric circles starting with the circle of zero radius at a center of said diameter D.

18. The method of claim 1 wherein said subapertures are nineteen in total number.

19. The method of claim 18 wherein said nineteen subapertures are disposed on concentric circles of one, six and twelve apertures each respectively, the one aperture concentric circle being of zero diameter and being located at the center of said diameter D.

20. The method of claim 19 wherein the location of said twelve apertures is shifted in angular position on the third of said concentric circles with respect to the angular position of the six sub apertures on the second of said concentric circles.

* * * * *

UNITED STATES PATENT AND TRADEMARK OFFICE
CERTIFICATE OF CORRECTION

PATENT NO. : 4,967,077
DATED : October 30, 1990
INVENTOR(S) : Steven M. Watson

It is certified that error appears in the above-identified patent and that said Letters Patent is hereby corrected as shown below:

Col 2, line 7, insert a hyphen between "far" and "field".
Col 2, line 50, "lenslet lit" should be ---lenslit---.
Col 3, line 62, "interrupting" should be ---intercepting---.
Col 3, line 66, a comma should follow "circles".
Col 4, line 27, a hyphen should follow "thirty".
Col 4, line 30, a hyphen should follow "sixty".
Col 4, line 33, a hyphen should follow "ninety".
Col 5, line 8, a comma should follow "is".
Col 5, line 40, a period should follow "subapertures".
Col 6, line 43, the colon should be a semicolon.
Col 6, line 64, a comma should follow "ten".
Col 7, line 21, the period should be a comma.
Col 7, line 22, "Pn" should be ---pn---.
Col 8, line 35, the period should be a comma.
Col 8, line 39, a left parenthesis should precede "complex".
Col 9, line 2, the first period should be a comma.
Col 9, line 24, ---$\pi$--- should precede "$(a_{ref})^2$".
Col 9, line 26, ---$\pi$--- should precede "$(a_{ref})^2$".
Col 9, line 28, ---$\pi$--- should precede "$(a_{ref})^2$".
Col 9, line 30, ---$\pi$--- should precede "$(a_{ref})^2$".
Col 9, line 32, ---$\pi$--- should precede "$(a_{ref})^2$".
Col 9, line 46, "B" should appear between quotation marks.

UNITED STATES PATENT AND TRADEMARK OFFICE
CERTIFICATE OF CORRECTION

PATENT NO. : 4,967,077
DATED : October 30, 1990
INVENTOR(S) : Steven M. Watson

It is certified that error appears in the above-identified patent and that said Letters Patent is hereby corrected as shown below:

Col 10, line 5, "□" should be ---π---.
Col 10, line 11, "□" should be ---π---.
Col 12, line 31, a period should follow "10a".
Col 13, line 41, "decerned" should be ---discerned---.
Col 13, line 58, the period should be a comma.
Col 13, line 58, a comma should follow "Radar".
Col 13, line 59, a comma should follow "telescope".

Signed and Sealed this

Seventh Day of July, 1992

Attest:

DOUGLAS B. COMER

*Attesting Officer*  *Acting Commissioner of Patents and Trademarks*